Feb. 8, 1966  W. A. HERPICH ET AL  3,233,760
REFUSE COLLECTING VEHICLE
Filed March 12, 1964  4 Sheets-Sheet 1
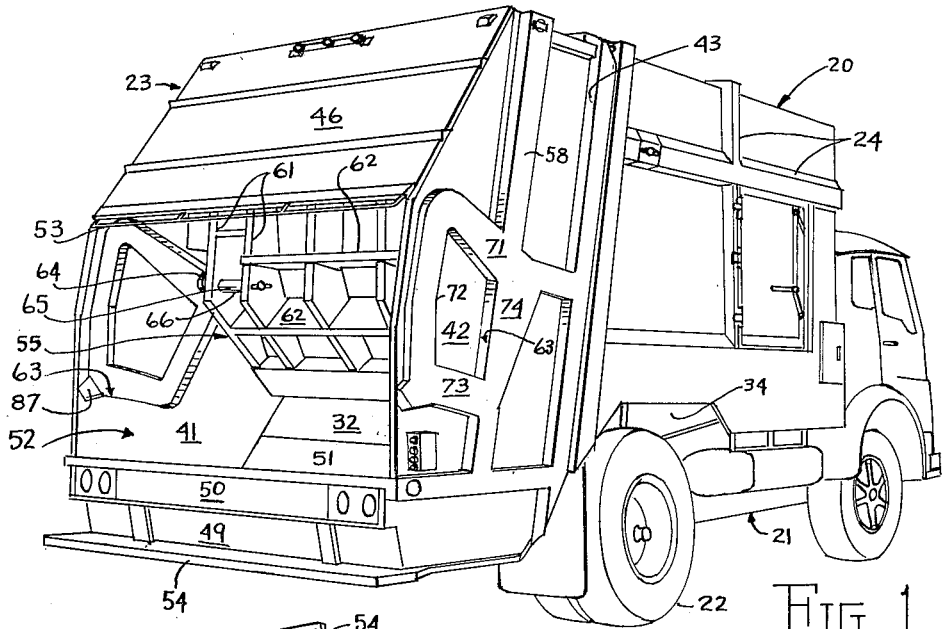
FIG_1_
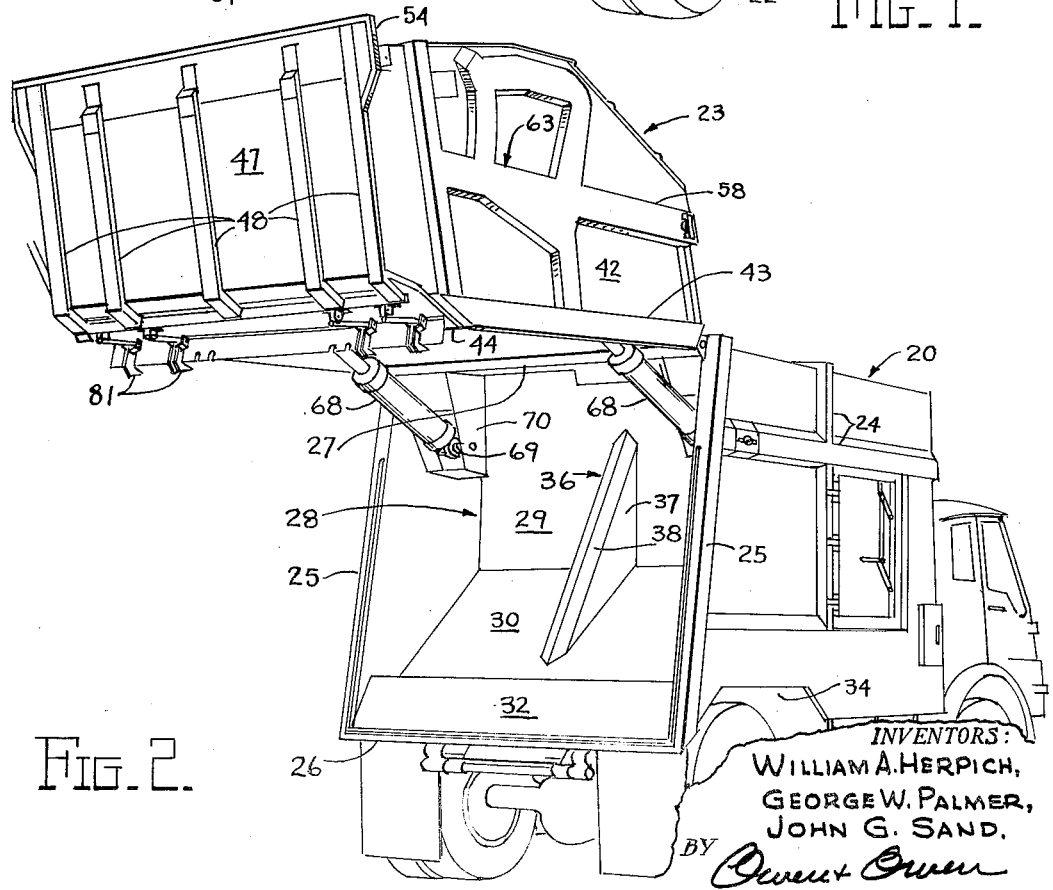
FIG_2_
INVENTORS:
WILLIAM A. HERPICH,
GEORGE W. PALMER,
JOHN G. SAND.
BY Owen + Owen
ATTORNEYS

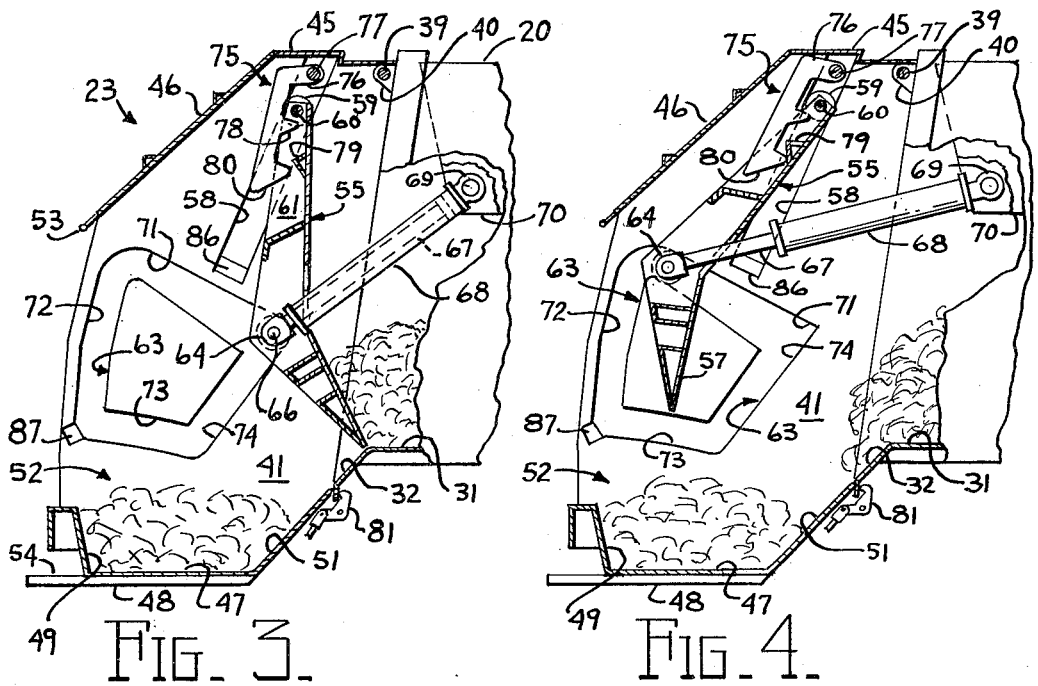
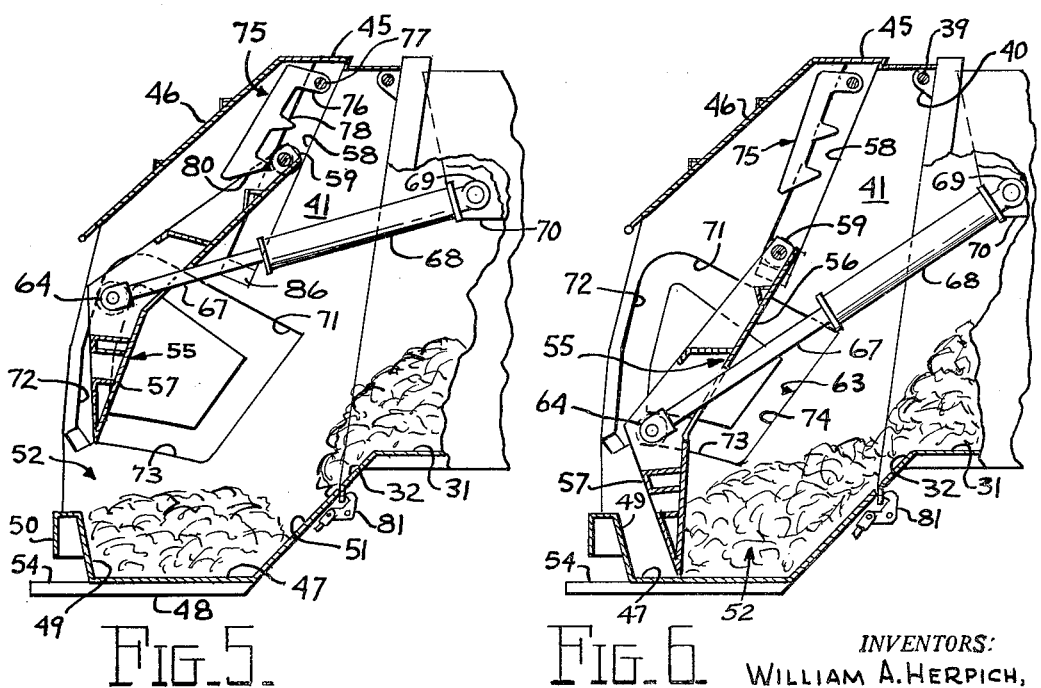

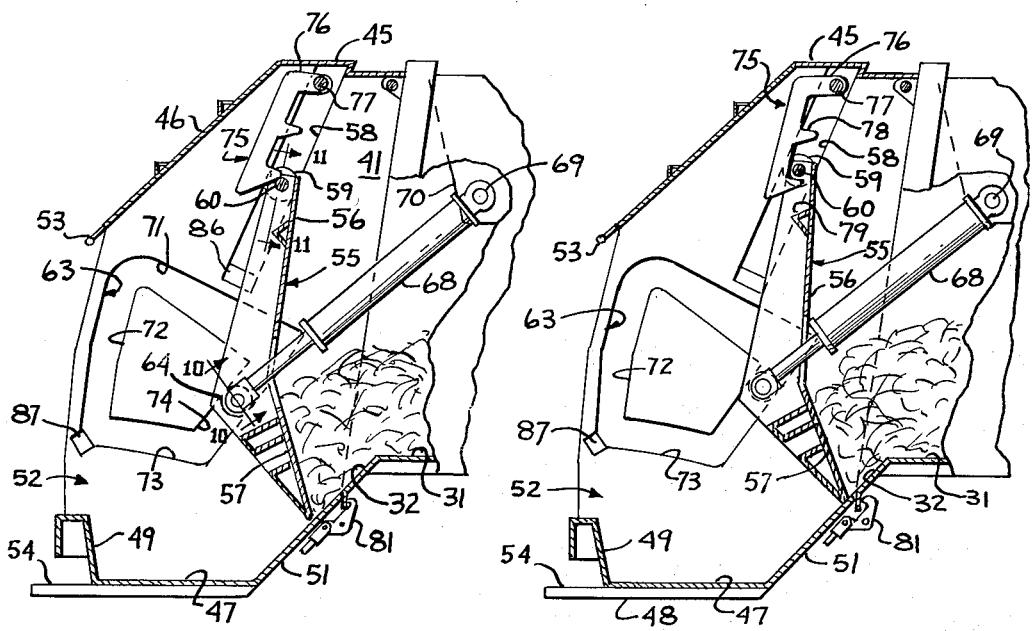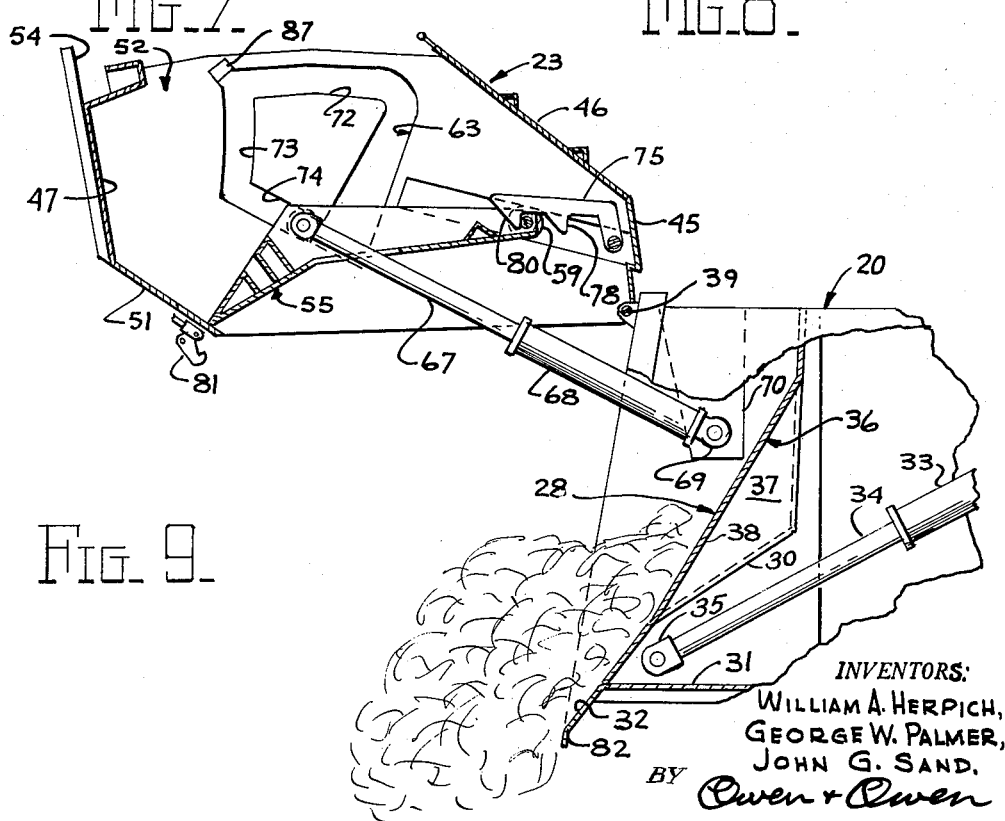

Feb. 8, 1966 W. A. HERPICH ET AL 3,233,760
REFUSE COLLECTING VEHICLE
Filed March 12, 1964 4 Sheets-Sheet 4

INVENTORS:
WILLIAM A. HERPICH,
GEORGE W. PALMER,
JOHN G. SAND,
BY Owen & Owen

United States Patent Office 3,233,760
Patented Feb. 8, 1966

3,233,760
REFUSE COLLECTING VEHICLE
William A. Herpich, George W. Palmer, and John George Sand, Galion, Ohio, assignors to Hercules Galion Products, Inc., Galion, Ohio, a corporation of Delaware
Filed Mar. 12, 1964, Ser. No. 351,442
14 Claims. (Cl. 214—83.3)

This invention relates to refuse collecting vehicles of the type customarily employed on city streets for the collection of trash, garbage, and other refuse from containers placed at the curbs of the streets.

Vehicles of this general type having hoppers at their rear ends are known and in some of these vehicles, at least, the hoppers and mechanisms for moving the refuse from the hoppers into the bodies of the vehicles are both contained in and supported by end gates which can be elevated out of the way for the discharge of the collected material from the bodies of the trucks. Some of these vehicles are of the dumping type wherein the body is tilted to dump the refuse after the tailgate has been opened, and others are of the ejection type in which an ejection plate is moved backwardly through the body for pushing the refuse out of the body after the tailgate has been opened. Many of these vehicles employ several sets of expensive hydraulic piston and cylinder arrangements in order to transfer refuse out of the receiving hoppers into the bodies of the vehicles, and others employ additional hydraulic piston and cylinder combinations in order to raise the tailgates up out of the way to permit the bodies to be tilted for dumping or to permit the ejection plates to be moved backwardly for ejecting the refuse out of the rear ends of the bodies. Because hydraulic piston and cylinder combinations are quite expensive, it is desirable that the number of such mechanisms employed should be reduced to a minimum.

Some vehicles which have been utilized for the above mentioned purpose have extremely complex mechanisms in their tailgates, including both liftable hoppers, packing blades, compacting blades, and complex linkages with the resulting requirement that the mechanism be equipped with various types of limit switches and other control means. All of these extra devices and accessories add cost to the vehicles and are liable to damage and result in malfunction.

Because it is difficult to adequately train the workers who load refuse into vehicles of this type to distinguish between those items of refuse which can adequately be handled by the vehicle and those which cannot, for example, bed springs, overstuffed chairs, and the like, those loading mechanisms which require the matching of moving parts in order to effect transfer of refuse from the hopper into the vehicle are very likely to be damaged during use.

It is therefore the principal object of the instant invention to provide a refuse collecting vehicle of the type generally described, wherein but a single moving part is utilized in order to effect movement of the refuse from the collecting hopper into the body of the vehicle.

It is another object of the instant invention to provide a refuse collecting vehicle of the rear end loading type wherein but a single set of hydraulic cylinders is employed for effecting transfer of the refuse from the collecting hopper into the body of the vehicle as well as the opening of the tailgate to permit expulsion of the collected refuse from the body of the vehicle.

It is yet another object of the instant invention to provide a refuse collecting vehicle having a rear end hopper wherein a single packing blade is employed for sweeping the refuse out of the hopper and for transferring it into the body of the vehicle without any additional mechanism being necessary in order to lift the refuse into position for engagement by the packing blade.

It is a still further object of the instant invention to provide a rear end loading type of refuse collecting vehicle wherein a single movable packing blade operates to sweep refuse out of a stationary hopper in the bottom of the tailgate of the vehicle and into the main body of the vehicle, effecting precompaction of refuse, for example, empty cardboard cartons, during the process of movement from the hopper into the vehicle body.

These and other more specific objects and advantages of a refuse collecting vehicle embodying the invention will be better understood from the specification which follows and from the drawings in which:

FIG. 1 is a rear quarter view in perspective of a refuse collecting vehicle embodying the invention, being shown with its refuse packing blade in position to retain the refuse within the main body of the vehicle and to provide for the emptying of refuse cans into a receiving hopper at the rear of the vehicle;

FIG. 2 is a view similar to FIG. 1 but showing the vehicle tailgate, which comprises the receiving hopper and the packing mechanism, swung upwardly out of the way so as to permit the ejection of refuse from the main body of the vehicle;

FIG. 3 is a fragmentary, diagrammatic view on a smaller scale, taken generally along a longitudial vertical plane of the vehicle shown in FIG. 1, with the operative parts of the vehicle in the position also shown in FIG. 1;

FIGS. 4, 5, 6, 7 and 8 are all figures similar to FIG. 3 and show the refuse moving mechanism at several successive positions in its cycle of operation in order to effect the transfer of a quantity of refuse from the receiving hopper into the interior of the main body of the vehicle;

FIG. 9 is a view similar to FIGS. 3–8, inclusive, but illustrating how the tailgate of a vehicle embodying the invention is elevated out of the way so as to provide for the ejection of refuse from the main body of the vehicle;

Figure 10:
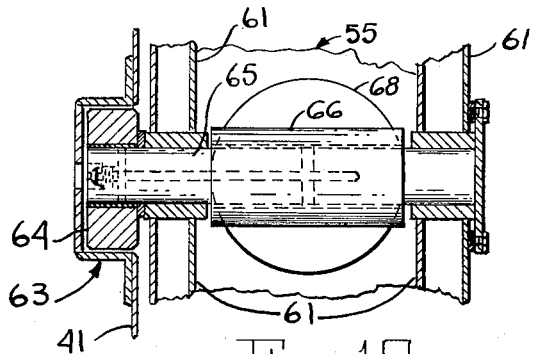
FIG. 10 is a fragmentary, vertical sectional view on an enlarged scale, taken along line 10—10 of FIG. 7.

A refuse collecting vehicle embodying the invention has a hollow, generally rectangular body 20 mounted in conventional fashion upon a truck chassis, generally indicated by reference number 21, and overlying, in part at least, rear wheels 22 of the chassis 21. The vehicle has a tailgate, generally indicated by the reference number 23, and shown in down or "closed" position in FIG. 1 and in elevated or "open" position in FIG. 2. The body 20 preferably is fabricated from sheet metal forming an enclosure of rectangular, vertical cross section reinforced, for example, by external channels 24 and having an open rear end defined by box channels 25 along the vertical edges, a bottom cross frame 26 and a top cross frame 27.

An ejection and precompaction plate 28 is slidingly mounted within the body 20 for movement from a position near the front of the body 20 to a rearmost position therein, illustrated in FIG. 9. The plate 28 is shown in FIG. 2 in a position spaced some six or eight inches forwardly of its rearmost position. The plate 28 comprises a vertically extending bulkhead 29 and a rearwardly extending incline 30. The ejection and precompaction plate 28 travels back and for longitudinally within the body 20, being moved over a floor 31 thereof. The floor 31 terminates in a rear incline 32 leading to the bottom rear cross frame 26. A hydraulic cylinder 33 (FIG. 9) is pivotally connected at the center of the upper front corner of the top and front wall of the body 20 and has a rod 34 pivotally connected to a swivel member 35 at the center bottom of the ejection plate 28. A generally triangular enclosure 36, having spaced vertical walls 37 and a back wall 38, extends between the bulkhead 29 and incline 30 at the rear center of the ejection plate 28. The enclosure 36 is hollow in its interior and provides room into which the rod 34 and cylinder 33 swing when the ejection plate 28 is moved to the front of the body, as well as bracing the ejection plate bulkhead 29 and incline 30.

The entire tailgate 23, as a unit, is pivotally mounted at the upper rear corner of the body 20 by a pivot rod 39 (FIG. 3 and following), which extends transversely across the body 20 and the tailgate 23, being engaged with a plurality of ears 40 welded or otherwise secured to the top cross frame 27 of the body 20 and several similar elements (not particularly shown) which are welded to the upper inner corner of the tailgate 23.

The tailgate 23 comprises opposed vertical and parallel sidewalls 41 and 42 that extend rearwardly from frame channels 43 which define the front vertical margins of the tailgate 23 and which lie adjacent the box channels 25 at the rear sides of the body 20 when the tailgate 23 is in its closed position. A bottom cross frame 44 of the tailgate 23 similarly lies adjacent the bottom cross frame 26 of the vehicle body 20 when the tailgate 23 is in its lowered position. The tailgate 23 has a generally flat top 45 (FIGS. 3-9) and a canopy 46 extending downwardly and rearwardly from the back edge of the top 45 and across between the upper rear, diagonally-cut corners of the sidewalls 41 and 42. The bottom of the tailgate 23 comprises a bottom plate 47 suitably strengthened by channels 48, an upwardly extending rear wall 49 having a return lip 50, and an upwardly and forwardly inclined front wall 51. The cross frame 44 is welded beneath and to the upper front edge of the inclined front wall 51 of the tailgate 23 and the front wall 51 is inclined at the same angle as the rear incline 32 of the floor 31 of the body 20 so that when the tailgate 23 is in closed position (FIGS. 1 and 3-8), the two are continuations of each other. The tailgate bottom plate 47, rear wall 49 and front wall 51 extend horizontally between the lower portions of the sidewalls 41 and 42 of the tailgate 23, forming a refuse receiving hopper, generally indicated by the reference number 52.

The lower, horizontal edge of the canopy 46, the upper horizontal edge of the junction between the rear wall 49 and lip 50, and the back edges of the sidewalls 41 and 42 define a large rectangular access opening into the tailgate 23 from the back of the vehicle. A handbar 53 (FIG. 1) is mounted across the rear, lower edge of the canopy 46 and a step 54 is supported on the rear ends of the channels 48 so that workers can ride along with the vehicle when it moves from place to place on a collection route.

Figure 11:
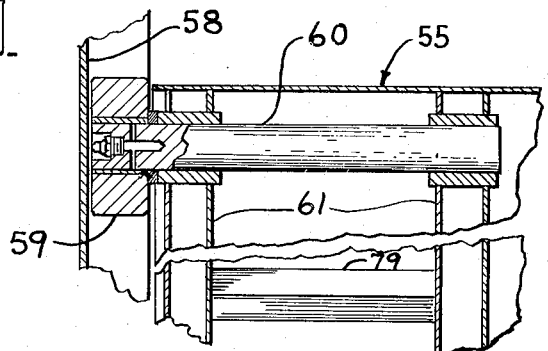
FIG. 11 is a fragmentary view in section taken along line 11—11 of FIG. 7.

A packer blade 55 is mounted for movement within the tailgate 23 for moving refuse out of the hopper 52 and into the interior of the body 20. The packer blade 55 extends all the way across the tailgate 23 between the sidewalls 41 and 42 thereof, and includes an upper, generally vertically extending section 56 and a lower, forwardly inclined section 57. The uppermost end of the packer blade 55 is guided during its cycle of operations by a pair of generally vertically extending tracks 58 (FIG. 11) which are fabricated from heavy sheet metal welded, for example, to the sidewalls 41 and 42 of the tailgate 23. At each of the upper, outer corners of the upper packer blade section 56, there is located a track engaging roller 59 which is rotatably mounted on the end of a horizontally stub rod 60, and stub rod 60 being fixedly secured in and extending through to adjacent reinforcing channels 61, several of which extend from top to bottom of the packer blade 55 and are additionally braced by horizontal reinforcing channels 62.

The two vertical tracks 58 are parallel to each other so that engagement of the two rollers 59 in the tracks 58 guides the upper end of the packer blade 55 for vertical movement within the tailgate 23 with the packer blade 55 extending across the tailgate 23 perpendicular to its sidewalls 41 and 42.

The path of movement of the packer blade 55 during a packing excursion is guided by a pair of closed, four-sided tracks, generally indicated by the reference number 63. The two tracks 63 in the sidewalls 41 and 42 are identically spaced on opposite sides of the tailgate 23 and each of the tracks 63 guides a track roller 64 (FIG. 10), one of which is supported at each side of the packer blade 55 along the the horizontal line of junction of its upper section 56 and lower section 57. Each of the track rollers 64 is rotatably mounted on the end of a stub rod 65, the stub rod 65 being fixed in and extending between the two vertical reinforcing channels 61 at each side of the packer blade 55. Each of the stub rods 65 also functions to pivotally carry a heavy sleeve 66 to which the end of one of a pair of piston rods 67 (FIGS. 3-9) is connected. The two piston rods 67 are movable in hydraulic cylinders 68, one at each side of the vehicle, and which cylinders 68 apply power to the packer blade 55 to carry it through its loading excursion as well as to effectuate opening of the tailgate 23 in a manner to be described below. The upper end of each of the cylinders 68 is pivotally mounted by a suitable support pin 69 which is carried, in turn, in one of a pair of heavy depending brackets 70 located at the upper, inner corners and near the rear of the body 20.

The closed four-sided tracks 63 in sidewalls 41 and 42 of the tailgate 23, have upwardly and rearwardly inclined legs 71 connected through arcs of relatively small radius to generally vertically extending rear legs 72. The rear legs 72 extend downwardly, generally parallel to the rear edges of the respective side wall 41 or 42 and terminate at a level above the bottom plate 47 of the tailgate 23 such that when the track rollers 64 reach the bottoms of the two legs 72 of the tracks 63, the bottommost edge of the packer blade 55 contacts the bottom plate 47. The tracks 63 also have forwardly extending bottom legs 73 which are generally parallel to the bottom plate 47 and which intersect front, upwardly inclined legs 74 of the tracks 63, the legs 74 intersecting the front ends of the legs 71 at their upper, forward ends. It will be observed in FIGS. 3-8, inclusive, that the top, rearwardly and upwardly inclined track legs 71 do not have parallel sidewalls as do the other three track legs 72, 73 and 74, but are wider at their front ends and at the junctions with the legs 74. The other three legs 72, 73 and 74 of the tracks 63 have sidewalls which are spaced a distance just slightly greater than the diameters of the rollers 64 which run in those tracks.

In FIG. 3, the packer blade 55 is shown in the position which it occupies during the loading of refuse into the receiving hopper 52. It will be noted that the bottommost edge of the packer blade 55 is located inwardly of the body 20 beyond the front end of the front wall 51 of the tailgate 23, and at the line of intersection of the bottom of the body 20 with the upper corner of the rear incline 32. The position shown in FIG. 3 retains previously loaded refuse within the body 20 and prevents it from falling downwardly back into the hopper 52 during transit between collection locations or during intervals between actuation of the packer blade 55 while the workers are dumping refuse into the hopper 52 through the access opening at the rear of the tailgate 23.

A normal loading excursion of the packer blade 55 consists of counterclockwise movement of its track rollers 64 around the respective closed tracks 63, progressing, in sequence, from the position shown in FIG. 3 through the position shown in FIGS. 4 and 5, to move the lower edge of the packer blade 55 backwardly over the mass of refuse in the hopper 52, downwardly to a position just previous to that shown in FIG. 6 so that the lower edge of the packer blade 55 slides down the inner side of the rear wall 49 and then forwardly and upwardly through the position illustrated in FIG. 7 to scoop the refuse upwardly out of the hopper 52 and into the body 20 and, finally, back to the position illustrated in FIG. 3.

Rearward movement of the packer blade 55 from the position illustrated in FIG. 3 is achieved by feeding oil under pressure to the cylinders 68 to extend their rods 67. However, because the track rollers 64 are located at the outermost corner of the intersection of the track legs 71 and 74, in this most forward position of the packer blade 55, means must be provided to insure that upon the initial extension of the cylinder rods 67 and movement of the packer blade 55, it will be guided upwardly and rearwardly along the track legs 71 rather than downwardly and back along the track legs 74. A temporary packer blade support pivot for each side of the packer blade 55 is located at the upper outer sides of the vertical tracks 58 and consists of an E-shaped catch 75. Each of the catches 75 has an upper arm 76, the forward end of which is pivoted on a pin 77 supported by the respective sidewalls 41 and 42, and a middle arm 78 which is spaced downwardly from the pivot pin 77 a distance such that the arm 78 swings inwardly beneath the respective stub rod 60 when the packer blade 55 is in the position shown in FIG. 3, i.e., at its most forward position of excursion, and the track roller 64 is at the upper outer corner of the intersection of the track legs 71 and 74. Upon energization of the cylinder 68 to initiate the extension of its piston rod 67, engagement of the stub rods 60 with the middle arms 78 of the catches 75 results in the packer blade 55 swinging in a clockwise direction on the catch arms 78 until the track rollers 64 move rearwardly across the open upper ends of the track legs 74 and engage the inner walls of the rearwardly extending track legs 71.

Because the track legs 71 are upwardly inclined, the rollers 64 raise the packer blade 55, lifting the stub rods 60 out of contact with the upper surfaces of the middle arms 78 of the catches 75 so as to minimize wear on these parts.

Immediately thereafter and while the packer blade 55 is moving rearwardly due to extension of the rods 67, cross angles 79 (FIGS. 3, 4, and 11) strike lower arms 80 of the two catches 75, camming the catches 75 backwardly, as illustrated in FIG. 4, to remove the middle arms 78 rearwardly from beneath the path of the stub rods 60 so that immediately after the packer blade 55 reaches the position shown in FIG. 4, and its track rollers 64 start down the rear legs 72 of the closed tracks 63, the upper track rollers 59 can move freely down the vertical tracks 58, passing the ends of the middle arms 78 and the catches 75.

Continued extension of the rods 67 pushes the track rollers 64 down the rear legs 72, moving the packer blade 55 vertically downwardly behind the charge of refuse in the hopper 52 and through the positions indicated in FIGS. 4 and 5 until the track rollers 64 reach the bottom, outer intersection of the rear track legs 72 and the bottom track legs 73. (This position is just following FIG. 5 and just ahead of FIG. 6.)

At this point in the cycle of operation of the packer blade 55, the hydraulic controls to the cylinders 68 are reversed so as to retract the rods 67 which pull the track rollers 64 along the bottom track legs 73 and moves the packer blade 55 forwardly from the position illustrated in FIG. 6 and toward the position illustrated in FIG. 7 as the track rollers 64 run up the forward track legs 74. It should also be observed, of course, that when the packer blade 55 is in the position illustrated in FIG. 6, its upper track rollers 59 are located at the bottom ends of the tracks 58. After the track rollers 64 have entered the upwardly and forwardly inclined front track legs 74, the upper track rollers 59 start to move upwardly in the generally vertical upper tracks 58.

The cycle is completed when the packer blade 55 and its associated parts return again to the position shown in FIG. 3 at which time suitable controls are actuated to relieve the hydraulic pressure on the cylinders 68 and to neutralize their controls for the initiation of a subsequent cycle.

During packing cycles as just described, the ejection plate 28, which travels back and forth in the body 20, is utilized for the purpose of precompacting refuse moved into the body 20 upon each actuation of the packer blade 55. For example, when the body 20 is empty, at the beginning of a route of refuse collection, the operator actuates suitable controls which extends the rod 34 out of its cylinder 33 to move the ejection and precompaction plate 28 backwardly in the body 20 to a position, say two or three feet from its rearmost position (FIG. 2). The ejection and precompaction plate 28 then forms a front bulkhead on the space into which the packer blade 55 feeds refuse. Oftentimes, refuse contains large bulky objects such as corrugated cardboard boxes, and the like, which occupy excessive space in the interior of the body 20 unless they are compacted or crushed during their movement into the body 20. The power of the two packer blade cylinders 68 is such that when the packer blade 55 is moved from the position shown in FIG. 7 to position shown in FIG. 8 and thence to the position in FIG. 3, sufficient force is applied to crush corrugated cardboard boxes, flattening them out to eliminate the otherwise wasted space within the body 20. After a number of packing cycles of the packer blade 55 have been completed and when the operator's experience teaches him that the space between the rear side of the ejection plate 28 and the packer blade 55 is filled with the refuse in properly precompacted condition, he actuates the controls to draw the rod 34 somewhat into its cylinder 33 and thereby to move the ejection and precompaction plate 28 forwardly in the body 20. He stops in some two or three feet in front of its previous position to provide space behind the bulkhead for the movement of additional charges of refuse. During the entire travel of the refuse vehicle, the operator continues to move the ejection and precompaction plate 28 forwardly in suitable increments of travel after each set or series of refuse loading cycles of the packer blade 55.

Figure 12:
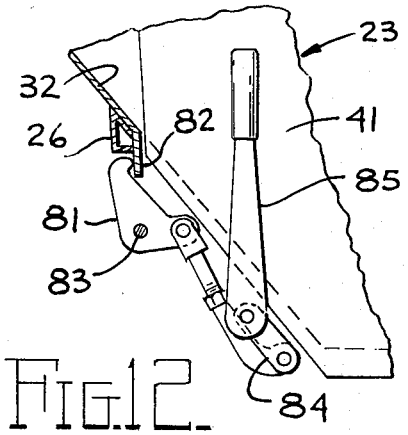
FIG. 12 is a fragmentary view in side elevation taken from the side of the vehicle opposite to that shown in FIG. 1, and illustrating in detail latch mechanism for locking the tailgate in its closed position.

During the collection of refuse, the tailgate 23 is held in its closed position by suitable latching means, for example, the latching means illustrated in FIG. 12, which comprises a series of latch fingers 81 engageable with a lip 82 on the bottom cross frame 26 of the body 20. The latch fingers 81 are mounted on a cross rod 83 which is connected by overcenter links 84 to a manually operable release handle 85 by which the latch fingers 81 may be disengaged.

Successive loads of refuse from the hopper 52 gradually fill the body 20 with the ejection plate 28 being moved forwardly until the refuse is so solidly packed that a charge from the hopper 52 cannot be forced into the body 20. When the packer blade 55 reaches the position shown in FIG. 8, the lower arm 80 of the catch 75 moves in beneath the stub rod 60. If the refuse is now solidly packed, the pressure in the cylinders 68 reaches a level such that it opens a pressure relief valve (not shown) which is set at a value to prevent structural damage, and the packer blade movement stops. The pressure relief may be of any conventional type and is located in the hydraulic circuit leading to the cylinders 68. Cessation of movement of the packer blade 55 signals the operator that the body is fully loaded so he departs for the dump or other discharge location, such as an incinerator.

Of course, the operator may open the tailgate at any time by reversing the movement of the packer blade 55 from the position shown in FIG. 3 back down the track legs 74 to the position shown in FIG. 8. In this position the bottom edge of the packer blade 55 is still within the borders of the tailgate 23.

With the mechanism in the position of FIG. 8, the operator extends the rods 67 which now swings the entire tailgate 23 rearwardly and upwardly from the position in FIG. 8 to that in FIG. 9. The operator then actuates controls to move the ejection plate 28 backwardly through the body 20.

The operator then reverses the hydraulic controls to the two packer blade cylinders 68, withdrawing their rods 67, and lowering the tailgate 23 downwardly to its closed position. Continued retraction of the rods 67 from the position thus achieved (FIG. 8) back to the position illustrated in FIG. 3 restores the packer blade 55 to its rest position.

During movement from the position illustrated in FIG. 8 to the position illustrated in FIG. 3, the cross angle 79 cams the catches 75 backwardly, successively engaging the lower inclined ends of the lower arms 80 and middle arms 78. By reason of the shape and mounting of the catches 75, gravity urges them in a counterclockwise direction, successively engaging the stub rods 60 with the arms 80 and 78 for the purposes hereinabove described.

Because the packer blade 55 is guided at both of its upper edges by the rollers 59 and at both sides of its center by the rollers 64, which run in the respective vertical tracks 58 and lower closed tracks 63, the packer blade 55 is firmly guided during its movement through the tailgate and maintained "square" in the gate.

In many rear end loaders of the type generally similar to that of the instant invention, the packer blade is merely pivoted on a rod or shaft extending along its upper edge and, although a pair of hydraulic cylinders may be connected to such a packer blade at some distance from its pivot shaft, stabilization and the prevention of twisting do not necessarily result. If, for example, a massive heavy object were located at one side of such a tailgate, that hydraulic cylinder at that side of the tailgate would not retract to a distance identical with the hydraulic cylinder on the other side of the tailgate where a comparable load did not exist. This would result in twisting the packer blade within the tailgate so that it might not sweep the gate clean, and might even damage the tailgate mechanism.

In sharp contrast, of course, in the tailgate construction of the instant invention, because the two sets of guide rollers are spaced vertically from each other a substantial distance and because each guide roller remains in its track, twisting of the packer blade 55 during its path of travel forwardly through the tailgate 23 is prevented even if a heavy object is lodged at one edge of the packer blade 55. The wide spacing of the rollers stabilizes the blade and results in an equalization of the movement of both sides.

In order to minimize the jamming of articles of refuse in either the vertical tracks 58 or the closed tracks 63, each of the tracks 58 and 63 has a short inclined relief opening 86 or 87, as the case might be, which leads any refuse in the tracks 58 or 63, respectively, to the inner surface of the sidewalls 41 and 42, whence it drops into the refuse hopper 52.

While the contour of the closed four-sided tracks 63 has been illustrated as having the junction between the rear, vertical track legs 72 and the lower horizontal track legs 73 so positioned that the packer blade 55 will move from one to the other without difficulty, an automatic one-way gate with a manual release may be positioned at the junction of the track legs 72 and 73 for purposes described below.

Referring now to FIG. 6, it will be seen that the packer blade 55 has been moved just past its rear lowermost position and that the rollers 64 have entered the lower horizontally extending legs 73 of the closed tracks 63. If, for example, a very heavy object were located in the bottom of the hopper 52, i.e., at the junction of its bottom plate 47 and rear wall 49, the lower edge of the packer blade 55 might strike this object and jam against it or, conceivably, when the packer blade rollers 64 were at the junction of the legs 72 and 73 and the hydraulic connections to the actuating cylinders 68 were reversed, the presence of this bulky object might cause the track rollers 64 to run back up the vertical track legs 72 rather than forwardly along the lower horizontal track legs 73.

Figure 13:
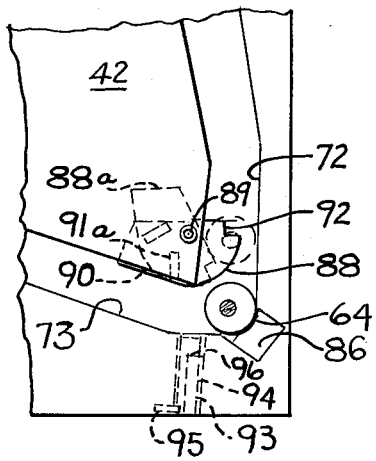
FIG. 13 is a fragmentary view in elevation of a track gate which constitutes an improved feature in a refuse collecting vehicle embodying the invention, the view being taken from the interior of the tailgate.
Figure 14:
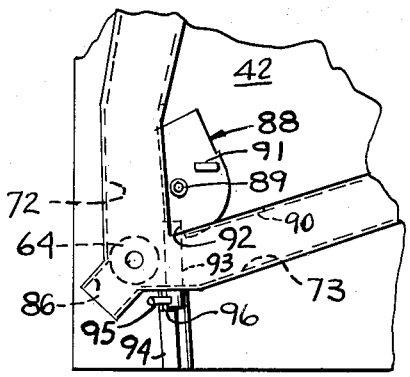
FIG. 14 is a view similar to FIG. 13 but taken from the exterior of the tailgate.

In order to obviate the movement of the track rollers 64 in the wrong direction from the junction of the track legs 72 and 73, and also to provide for optional selection of the direction of movement of the track rollers 64 and thus the packer blade 55 from this position, a rear end loader embodying the invention may be provided with a track gate mechanism illustrated in FIGS. 13 and 14.

In FIG. 13, an automatic track gate 88 for one of the two closed tracks 63 is shown in solid lines in the position it occupies except when engaged by a track roller 64 or when it is manually shifted to an inoperative position and the gate 88 is shown in partially displaced position in dotted lines indicated by the reference number 88a.

The track gate 88 is substantially semicircular in shape, being cut from relatively heavy sheet steel, for example, and is pivotally mounted by a heavy pin 89 at the junction of the respective forward vertical track leg 72 and lower, generally horizontal extending, track leg 73. A slot 90 is cut through the horizontal surface of the inner sides of the track legs 72 and 73 at the intersection therebetween and the track gate 88 is pivotally mounted by the pin 89 to swing through the slot 90. A counterweight 91 (see FIG. 14) is secured on the outer surface of the gate 88 in such position as to urge the gate 88 into the solid line position in FIG. 13 and also to function as a stop for the gate 88 in that position, coming up against the outer surface of the inner sidewall of the vertical track leg 72, as illustrated in FIG. 13 and shown in dotted lines indicated by the reference number 91a.

When the packer blade 55 is moved downwardly with the rollers 64 moving along the vertical track legs 72, the rollers 64 engage the upper horizontal edges of the track gates 88, camming them downwardly (clockwise—FIG. 13) and displacing them outwardly from the vertical track legs 72, as shown in dotted lines in FIG. 13. After the track rollers 64 pass the track gates 88, the counterweights 91 swing the track gates 88 back into track obstructing position (counterclockwise—FIG. 13). Therefore, when the track rollers 64 reach the bottom of the intersections between the vertical track legs 72 and the horizontal track legs 73, and the hydraulic connections to the actuating cylinders 68 are reversed, it is impossible for the track rollers 64 to go back up the vertical track legs 72 and the continuation of the excursion of the packer blade 55 from that point forwardly through the tailgate 23 is assured.

If material is jammed in the lower part of the hopper 52 or, for some other reason the operator desires to traverse the packer blade 55 back upwardly from the rear lowermost, position, i.e., to roll the track rollers 64 back up the vertical track legs 72, the track gates 88 can be swung out of the way, as illustrated in FIG. 14. It will be observed that at the rear upper corner of each of the track gates 88 there is cut a rectangular notch 92 which is aligned with the end of a bolt 93, shown in lower or inactive position in FIG. 13, and in upper or active position in FIG. 14. The bolt 93 slides in a slotted tube 94 positioned on the exterior of the respective tailgate sidewall 41 or 42 and accessible from the exterior of the vehicle. The bolt 93 has a handle 95 by which the operator may slide the bolt 93 vertically and which can be swung angularly and horizontally into a circumferential slot 96 cut in the tube 94 to lock the bolt 93 in its uppermost position.

As can best be seen in FIG. 14, the operator grasps the counterweight 91 and swings the track gate 88 into its uppermost position, placing the notch 92 in alignment with the bolt 93. If the gate 88 is not swung to its completely retracted position, when the operator slides the bolt 93 upwardly, it will not move high enough for the handle 95 to be swung horizontally into the slot 96. If, however, the operator has swung the track gate 88 into completely inoperable position, the notch 92 is aligned with the end of the bolt 93 and the operator can lock the bolt 93 in its uppermost position and the track gate 88 in its retracted position, as illustrated in FIG. 14. In addition to locking the track gates 88 in their retracted position, the bolts 93 also extend across the lower rear ends of the horizontal track legs 73 and prevent the entry of the track rollers 64 into the track legs 73.

Under the circumstances just described, therefore, when the track rollers 64 reach the intersection of the ends of the track legs 72 and 73 and the operator disengages the automatic track gates 88 and bolts them into retracted position, as shown in FIG. 14, when the hydraulic connections to actuating cylinders 68 are reversed, the packer blade 55 is moved upwardly from this position with the track rollers 64 running back up the track legs 72. This permits the operator to remove or disengage whatever material may have jammed the packer blade 55 in its lower rearmost position without risking damage to other parts of the mechanism which would result if it were necessary to carry the packer blade 55 forwardly through an excursion before the jam could be cleared.

After relieving the jam or cleaning away the material which is causing the trouble, the operator releases the bolts 93, dropping them into their lower position and allowing the automatic track gates 88 to swing back into operative position (FIG. 13) and then reverses the hydraulic connections to the actuating cylinders 68 to cause the packer blade 55 to move downwardly to the lower and rearmost position and thence, upon another reversal of such connections, to move forwardly along the lower track legs 73 for sweeping refuse out of the tailgate 23.

We claim:

1. In a refuse collecting vehicle having a body and a tailgate hinged to the rear end of said body at the top thereof for movement between a lowered position adjacent the rear end of said body and an elevated position, said tailgate having vertical, spaced sidewalls, in combination, a refuse collecting hopper in the bottom of said tailgate, a generally vertically extending packer blade located in said tailgate and extending across said tailgate between said sidewalls, a generally vertical guide track in each of said sidewalls, said guide tracks being parallel, means at the sides of the upper part of said packer blade and engaged in said tracks for guiding the upper part of said packer blade for generally vertcial movement in said tracks and for pivotal movement of said packer blade relative to the upper part thereof during such vertical movement, means in said tailgate for guiding the movement of the lower end of said packer blade through a closed path from a front position with the upper end thereof at a higher vertical level and the lower end of said packer blade lying across the rear end of said body, thence backwardly over refuse in said hopper, thence downwardly behind such refuse, and thence forwardly through said hopper to said first position for moving refuse out of said hopper into said body, means located above the closed path and engaging the upper end of the packer blade effective for preventing downward movement of said packer blade at the beginning of a rearward movement of said packer blade from the front position thereof, and power means connected between the upper rear end of said body and a point on said packer blade between the upper and lower ends thereof for moving said packer blade rearwardly and forwardly in said tailgate.

2. A refuse collecting vehicle according to claim 1 wherein the means effective for preventing downward movement of said packer blade at the beginning of a rearward movement of said packer blade from the front position thereof comprises, cooperating temporary catch means on the upper end of said packer blade and in the upper part of said tailgate for suspending said packer blade in a fixed pivotal position thereon at such beginning of the rearward movement of said packer blade from the front position thereof.

3. A refuse collecting vehicle according to claim 1 and means engageable with the upper end of the packer blade when said packer blade is in a position within said tailgate near the front side thereof and rearwardly of the front position of said packer blade for preventing reverse movement of said packer blade relative to said tailgate in the closed path, whereby energization of the power means for rearward movement of said packer blade swings said tailgate away from the rear end of the body to elevated position.

4. A refuse collecting vehicle according to claim 1 in which the means for guiding the lower end of the packer blade comprises a track in each of said sidewalls, said tracks being parallel to each other and each of said tracks defining a continuous path having vertically spaced, generally horizontally extending legs connected by front and back, inclined, generally vertically extending legs, and means at each side of said packer blade engaging the respective one of said tracks.

5. A refuse collecting vehicle according to claim 1 in which the means at the upper sides of the upper part of the packer blade consists of a roller mounted on each side of said packer blade and engaged in the respective one of the vertical tracks and in which the means for guiding the lower end of the packer blade comprises a closed path track having vertically spaced legs in each of the sidewalls of the tailgate and a roller on each side of said packer blade and engaged in the respective one of said tracks.

6. In a refuse collecting vehicle having a body and a tailgate hinged to the rear end of said body at the top thereof for movement between a lowered position adjacent the rear end of said body and an elevated position, said tailgate having vertical, spaced sidewalls, in combination, a refuse collecting hopper in the bottom of said tailgate, a generally vertically extending packer blade located in said tailgate and extending across said tailgate between said sidewalls, a generally vertical guide track in each of said sidewalls, said guide tracks being parallel, a track roller at each of the upper corners of said packer blade and engaged in said tracks for guiding the upper end of said packer blade for generally vertical movement in said tracks and for pivotal movement of said packer blade relative to the upper end thereof during such vertical movement, guide tracks in the sidewalls of said tailgate for guiding the movement of the lower end of said packer blade through a closed path from a front position with the upper end thereof at a higher vertical level and the lower end of said packer blade lying across the rear end of said body, thence backwardly over refuse in said hopper, thence downwardly behind such refuse, and thence forwardly through said hopper to said first position for moving refuse out of said hopper into said body, a roller mounted at each side of said packer blade at a point between the upper and lower ends thereof and engaged in the respective one of said tracks, means located above the closed path and engaging the upper end of the packer blade effective for preventing downward movement of said packer blade at the beginning of a rearward movement of said blade from the front position thereof, and power cylinder means connected to the upper rear end of said body and to said packer blade for moving said packer blade rearwardly and forwardly in said tailgate.

7. In a refuse collecting vehicle having (1) a body, (2) a tailgate hinged to the rear end of said body at the top thereof for movement between a lowered position adjacent the rear end of said body and an elevated position, said tailgate having (a) vertical, spaced sidewalls and (b) a refuse collecting hopper in the bottom of said tailgate, and (3) a packer blade located generally vertically in said tailgate and extending across said tailgate between said sidewalls, mechanism for moving and guiding said packer blade, said mechanism comprising a generally vertical guide track in each of said sidewalls, said guide tracks being parallel, a track roller at each of the upper outer edges of said packer blade and engaged in the respective one of said tracks, a closed track in each of the sidewalls of said tailgate, said tracks being parallel, and each of said tracks having a generally horizontal leg for guiding said packer blade from a front position with the upper end of said packer blade at a higher vertical level and the lower end of said packer blade lying across the rear end of said body backwardly over refuse in said hopper, a rear leg for guiding said packer blade downwardly behind such refuse, a lower, generally horizontal leg for guiding said packer blade forwardly through said hopper, and an upwardly inclined leg for guiding said packer blade back toward and to said first position, power means connected between the upper rear end of said body and a point on said packer blade between the upper and lower ends thereof for moving said packer blade rearwardly and forwardly in said tailgate and cooperating temporary catch means on the upper end of said packer blade and near the top of the sidewalls of said hopper for suspending said packer blade in a fixed pivotal position thereon at the beginning of a rearward movement of said packer blade from the front position thereof.

8. In a vehicle of the class described, having a body, a hollow tailgate with vertical sidewalls and a packer blade movable therethrough for moving refuse from said tailgate into the vehicle, said packer blade having an upper, generally vertical portion and a lower, angularly swept forward portion, the improvement comprising, in combination, vertically extending track means in the upper part of said tailgate, rollers mounted at the upper corners of said packer blade and engaged in said vertical track means, a loop guide track in each of said sidewalls, a second roller at each side of the center portion of said packer blade and engaged in the respective one of said loop guide tracks, power cylinder and rod means pivotally connected at one end to said packer blade at approximately the axis of said second roller and at the other end to the upper rear end of said body and temporary catch means in the upper part of said tailgate for momentarily suspending said packer blade in elevated pivotal position at the start of a cycle of extension of said power cylinder and rod means for preventing movement of said second rollers in a reverse direction around said loop guide tracks.

9. Mechanism for guiding and moving a generally vertical packer blade through a closed path in a pivoted loading type tailgate of a refuse collecting vehicle body, said mechanism comprising, a pair of generally vertical lineal guide tracks in said tailgate, one at each side of said packer blade in the upper part of said tailgate, a roller near each upper corner of said packer blade and engaged in the respective one of said lineal tracks, a pair of closed loop guide tracks in said tailgate, one at each side of said packer blade, a roller at the center of each of the sides of said packer blade and engaged in the respective one of said closed loop guide tracks, a power cylinder and rod pivotally connected to and extending between the center part of said packer blade and an upper part of the vehicle body, whereby extension of said rod moves said packer blade backwardly in said tailgate along a path determined by said closed loop guide tracks and retraction of said rod returns said packer blade forwardly through said tailgate toward the vehicle body, and to a front position closing the rear end of the vehicle body, a disengageable latch at the upper part of said tailgate pivotally engaging said packer blade at such front position thereof and restraining said packer blade against reverse movement from said front position along said closed loop guide track upon extension of said rod and a secondary latch in the upper part of said tailgate engageable with said packer blade at a second position during movement thereof toward and before arrival at such front position thereof, for restraining said packer blade against reverse movement from said second position, whereby extension of said rod when said packer blade is at front position moves said packer blade backwardly through said tailgate and extension of said rod when said packer blade is at said second position moves said tailgate on its pivot relative to said body.

10. Mechanism according to claim 9 in which each of the closed loop tracks has a rear, generally vertical leg and a lower, generally horizontal leg intersecting the lower end of said vertical leg and extending forwardly therefrom, and a track gate mounted near the intersection of said legs, means biasing said gate toward position across said leg above such intersection, and in the path of downward movement of the respective one of said track rollers, and manually operable latch means for holding said latch in inoperative position out of said vertical track leg.

11. Mechanism according to claim 10 in which the latch means obstructs the rear end of said horizontal track leg when latched for preventing movement of the respective one of said track rollers forwardly into said horizontal track leg.

12. In a refuse collecting vehicle having a body and a tailgate hinged to the rear end of said body at the top thereof for movement between a lowered position adjacent the rear end of said body and an elevated position, the tailgate having vertical spaced sidewalls and a bottom, the sidewalls and the bottom defining a hopper, a generally vertically extending packer blade located in the tailgate and extending across the tailgate between the sidewalls, means for guiding movement of said packer blade through a path from a front position wherein the lower end of the packer blade lies across the rear end of the body, thence backwardly over refuse in the hopper, thence downwardly behind the refuse, and thence forwardly through the hopper to said first position for moving refuse out of the hopper into the body, and power means for moving the packer blade along such path, the improvement comprising, cooperating catch means on said packer blade for suspending said packer blade in a fixed pivotal position thereon at the beginning of the backward movement of said packer blade along such path.

13. Cooperating catch means according to claim 12, including means engageable with said packer blade when said packer blade is in a position within said tailgate near the front side thereof for preventing reverse movement of said packer blade relative to said tailgate in the path, whereby energization of the power means for rearward movement of said packer blade swings said tailgate away from the rear end of the body to the elevated position.

14. In a refuse collecting vehicle having a body and a tailgate hinged to the rear end of said body at the top thereof for movement between a lowered position adjacent the rear end of said body and an elevated position, said tailgate having vertical, spaced sidewalls, in combination, a refuse collecting hopper in the bottom of said tailgate, a generally vertically extending packer blade located in said tailgate, and extending across said tailgate between said sidewalls, a first pair of parallel generally vertical guide tracks, one of said first pair of guide tracks being located in each of said sidewalls, means at the sides of the upper part of said packer blade and engaged in said first pair of guide tracks for guiding the upper part of said packer blade for generally vertical movement in said first pair of guide tracks and for pivotal movement of said packer blade relative to the upper part thereof during such vertical movement, a second pair of guide tracks located below said first pair of guide tracks in opposed sidewalls of said tailgate for guiding the movement of the lower end of said packer blade through a closed path from a front position with the upper end thereof at a higher vertical level and the lower end of said packer blade lying across the rear end of said body, thence backwardly over refuse in said hopper, thence downwardly behind such refuse, and thence forwardly through said hopper to said first position for moving refuse out of said hopper into said body, means effective for preventing downward movement of said packer blade at the beginning of a rearward movement of said packer blade from the front position thereof, and power means connected between the rear end of said body and said packer blade for moving said packer blade rearwardly and forwardly in said tailgate.

References Cited by the Examiner
UNITED STATES PATENTS
3,143,230   8/1964   Gollnick _____ 214—83.3 X
FOREIGN PATENTS
1,166,080   11/1958   France.

GERALD M. FORLENZA, *Primary Examiner.*